Oct. 14, 1947.   R. MITCHELL   2,429,103
THREADED FASTENER
Filed July 5, 1944

Inventor
Robert Mitchell
By Barthel + Bugbee
Attorneys

Patented Oct. 14, 1947

2,429,103

UNITED STATES PATENT OFFICE 2,429,103

THREADED FASTENER

Robert Mitchell, Detroit, Mich.

Application July 5, 1944, Serial No. 543,551

4 Claims. (Cl. 151—22)

1

The present invention relates to improvements in threaded fasteners and more particularly to a friction gripping stop nut and method of making the same.

The primary object of the invention is to provide a threaded fastener of the friction gripping type which is adapted for use in various climates and to provide a friction gripping stop nut which may be subjected to changes in temperature without causing deterioration of the friction gripping insert and variations in the driving torque of the nut due to climatic conditions.

Another object of the invention is to provide a threaded fastener having a friction gripping insert adapted to be received in a tapered counterbore in the top of the nut body to facilitate retention of the insert without employing various upsetting processes and the like which are commonly used to retain friction gripping inserts in place.

Another object of the invention is to provide a lock nut of the above-mentioned type in which the nut body and insert are threaded, the threads of the nut body being of a predetermined diameter and the threads of the insert being slightly smaller in diameter to insure a tight gripping action and the retention of the nut on the bolt or other threaded member upon which it is placed.

Another object of the invention is to provide a lock nut of the above-mentioned type in which the threads of the insert and nut body are continuous and in which the threads of the nut body are partly formed in the insert to facilitate starting and to permit the nut to be threaded upon a bolt or other threaded member with uniform tension and friction.

Another object of the invention is to provide a threaded fastener in the form of a stop nut which will not be affected by various climatic conditions and which is rugged in construction and will withstand considerable wear and usage without becoming loose on the threaded member or bolt upon which the stop nut is placed.

Heretofore, it has been common practice to provide elastic stop nuts with fiber inserts to frictionally engage the threads of the bolt or other threaded member upon which the stop nut is placed and thereby retain the nut in place. By reason of the fact that the fiber insert absorbs considerable moisture under climatic conditions,

2 it is necessary to provide elastic inserts of fiber to withstand extremely cold climates without disintegration and to provide another type of nut adaptable for use in extremely warm climates. Usually, the nuts are constructed to withstand a certain predetermined temperature condition in order to provide a uniform driving torque in the particular climatic condition for which the nut is intended, and this is accomplished by providing a specific type of nut for extremely cold climates and a different type of nut for use in warmer climates. Thus, it is necessary to employ two different types of nut locks or threaded fasteners of the stop nut type which react under the specified climatic conditions to produce the desired result. The above practice is objectionable in that it necessitates the use of a plurality of sets of nuts, one for each climate to compensate for the temperature differences.

The above disadvantages and objections are overcome by providing a threaded fastener with a metallic insert formed of a metal alloy relatively softer than the body of the nut and having a threaded bore of a diameter slightly smaller than the threaded bore in the body of the nut and thereby provide the insert and threaded bore of the nut with differential threads to produce the correct driving torque under all climatic conditions. Reference is hereby made to my co-pending application, Serial No. 477,040, filed February 25, 1943, which discloses and claims a lock nut having an insert provided with slightly tapered internal threads which tightly lock the threads of a straight threaded bolt when the latter is threaded through them.

Other objects and advantages of the invention will become apparent during the course of the following description of the accompanying drawing, wherein.

Figure 6:
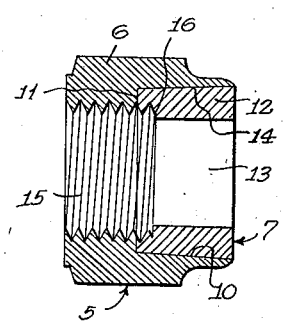
Figure 7:
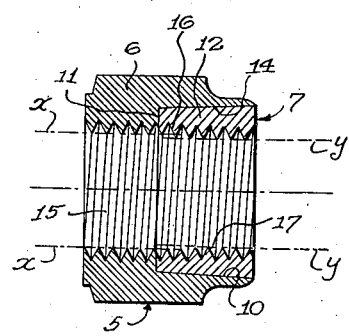

Figure 6 is a diametrical cross sectional view illustrating the manner in which the bore of the nut body is threaded with screw threads of a predetermined dimension and the manner in which the threads are continued into a portion of the insert to facilitate starting of the nut body on the threaded member such as a bolt or the like; and Figure 7 is a diametrical cross sectional view illustrating the bore of the insert and the manner in which the same is threaded with screw threads of a slightly smaller diameter and dimension for the remaining portion of its length.

In the drawing, there is shown the body 5 of a nut blank generally designated 6 containing an annular insert, generally designated 7.

Figure 1:
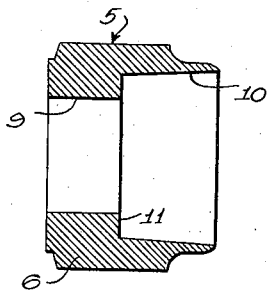
Figure 1 is a diametrical cross sectional view of the body of the threaded fastener blank illustrating the contour of the counterbored recess and showing the general contour and shape thereof.
Figure 2:
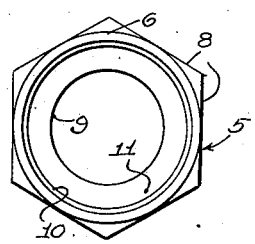
Figure 2 is a top plan view of the nut body further illustrating the tapered recess therein.
Figure 3:
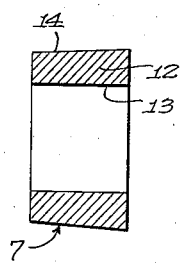
Figure 3 is a diametrical cross sectional view of the metallic insert adapted to be received in the recess of the nut body.
Figure 4:
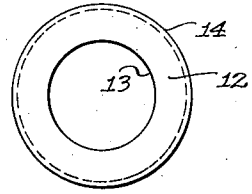
Figure 4 is a top plan view of the insert showing the general configuration thereof.

The nut blank 6 is formed hexagonal in shape and is provided with facets 8 for receiving a wrench or the like and is reduced in diameter at the upper end as shown in Figures 1 and 2. The body portion is provided with a central bore 9 having an axially extending counterbored recess 10 which is tapered slightly and enlarged to provide a seating wall 11 interconnecting the bore 9. The taper of the recess 10 is sufficient to retain the insert 7 in a manner which will be presently described.

Figure 5:
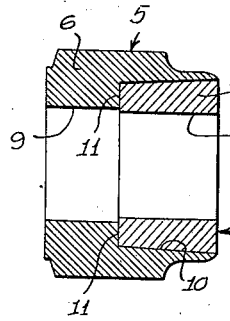
Figure 5 is a diametrical cross sectional view of the assembled threaded fastener blank illustrating the manner in which the insert is received in the nut body.

The insert 7 embodies a blank 12 formed of a relatively soft metal alloy having a central bore 13 and a tapered round peripheral wall 14 of substantially the same taper as that of the recess 10, and the bore 13 of the insert 7 is slightly smaller in diameter than the bore 9 of the nut blank 6. In assembling the insert 7 within the tapered recess 10, the nut blank 6 is placed upon a suitable support and the insert 7 is forced into the tapered recess 10 under pressure to force said insert into seating relationship with the seat 11 and thereby firmly hold and secure the insert in position with the top of the insert substantially flush with the top edge of the reduced portion of the nut blank. After the insert has thus been press-fitted into place (Figure 5) to cause the same to be snugly and frictionally held in place, the bore 9 of the nut blank 6 is threaded as at 15 with relatively larger diameter threads having a thread diameter $x—x$ (Figure 7) by means of a suitable tap. The tap is inserted through the bottom of the nut to extend the large diameter threads to a point as at 16 (Figure 6) wherein a portion of the insert bore 13 is also threaded for a short distance with the large-diameter threads 15.

The bore 13 of the insert 7 is then threaded with threads 17 of a slightly smaller diameter as indicated by the dotted lines $y—y$. It will be seen from Figure 7 that the threads 15 and 17 are of the same pitch and in the same phase although of slightly different diameters. The bolt threads are screwed easily through the large-diameter threads 16 in the bore 9 and partway into the bore 13 of the insert 7, thereby anchoring the latter firmly in its seated position before engaging the smaller diameter threads thereof.

When the bores 9 and 13 of the nut body 5 and insert 7 respectively have thus been threaded to provide differential threads 15 and 17, the stop nut may be placed upon a bolt or other threaded member and retained thereon by the frictional gripping action of the reduced threaded portion 16 of the insert, and it has been found in practice that the nut body 5 will not expand or contract appreciably when subjected to various climatic conditions to affect the driving torque of the friction gripping stop nut so as to obtain a nut or threaded fastener which is capable of being used a number of times and having a uniform driving torque under any and all conditions.

It is to be noted that the complementary tapered walls of the recess 10 and insert 14 securely wedge the same in snug frictional relationship and prevent rotation of the insert within the nut body. Also, it is to be noted that the partial threading of the insert bore 13 with threads of the same diameter and pitch as the threads 15, enhances the starting of the threaded fastener on a bolt or other threaded member.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. A lock nut having a threaded body with an enlarged inwardly-tapered countersunk smooth recess at one end, and an annular metallic insert of like taper retained in said recess by frictional contact against rotative and axial displacement, said insert having threads of the same pitch but less diameter than those of said body and in phase therewith, said body threads extending partway into said insert whereby a threaded member threaded through said body engages said last-mentioned insert threads to anchor said insert in said recess before engaging said less diameter insert threads.

2. A lock nut having a threaded body with an enlarged inwardly-tapered countersunk smooth recess at one end, and an annular metallic insert of relatively softer metal but of like taper retained in said recess by frictional contact against rotative and axial displacement, said insert having threads of the same pitch but less diameter than those of said body and in phase therewith, said body threads extending part way into said insert whereby a threaded member threaded through said body engages said last-mentioned insert threads to anchor said insert in said recess before engaging said less diameter insert threads.

3. A lock nut having a threaded body with an enlarged counter-sunk smooth recess at one end, and an annular metallic insert retained in said recess by frictional contact against rotative and axial displacement, said insert having threads of the same pitch but less diameter than those of said body and in phase therewith, said body threads extending partway into said insert whereby a threaded member threaded through said body engages said last-mentioned insert threads to anchor said insert in said recess before engaging said less diameter threads.

4. A lock nut having a threaded body with an enlarged counter-sunk smooth recess at one end, and an annular metallic insert of relatively softer metal retained in said recess by frictional contact against rotative and axial displacement, said insert having threads of the same pitch but less diameter than those of said body and in phase therewith, said body threads extending partway into said insert whereby a threaded member threaded through said body engages said last-mentioned insert threads to anchor said insert in said recess before engaging said less diameter threads.

ROBERT MITCHELL.

REFERENCES CITED

The following references are of record in the file of this patent:

UNITED STATES PATENTS

| Number | Name | Date |
|---|---|---|
| 426,185 | Ibbotson | Apr. 22, 1890 |
| 2,332,661 | Nahlinger | Oct. 26, 1943 |
| 1,467,824 | Ahlers | Sept. 11, 1923 |
| 1,742,722 | Olson | Jan. 7, 1930 |
| 462,318 | Loehner | Nov. 3, 1891 |
| 2,204,385 | Schmidt | June 11, 1940 |
| 2,324,731 | Simmonds | July 20, 1943 |
| 1,986,891 | Green | Jan. 8, 1935 |
| 1,470,528 | Flentien | Oct. 9, 1923 |
| 2,384,953 | Miller | Sept. 18, 1945 |
| 2,222,460 | Crowley | Nov. 19, 1940 |
| 2,255,384 | Hood | Sept. 9, 1941 |

FOREIGN PATENTS

| Number | Country | Date |
|---|---|---|
| 251,758 | Germany | Oct. 9, 1912 |
| 228,002 | Great Britain | Jan. 29, 1925 |

OTHER REFERENCES

Ser. No. 344,390, Schuttler (A. P. C.), published May 4, 1943.